United States Patent Office 3,592,777
Patented July 13, 1971

3,592,777
FLUORESCENCE EXHIBITING POLYMER BLENDS
John W. Bayer, Toledo, Ohio, assignor to
Owens-Illinois, Inc.
No Drawing. Division of applications Ser. No. 791,523,
Jan. 15, 1969, now Patent No. 3,506,613, and Ser. No.
472,058, July 14, 1965. This application Mar. 13, 1969,
Ser. No. 807,078
Int. Cl. C09k 1/02
U.S. Cl. 252—301.2R          10 Claims

ABSTRACT OF THE DISCLOSURE

There is disclosed the preparation of novel polymer blends that exhibit fluorescence when subjected to selected activation energy. The preparation comprises reacting an aliphatic or aromatic substituted aliphatic diketone and an aliphatic diamine such that there results a linear, non-cross-conjugated polymer exhibiting fluorescence under appropriate energy excitation, said polymer having no chromophore groups in its structure which will internally absorb the fluorescence emission of the polymer, and then blending said prepared polymer with another polymer in an amount sufficient to impart fluorescence to the resulting blend.

RELATED CASES

This is a division of copending U.S. patent application Ser. No. 791,523, filed Jan. 15, 1969, now U.S. Letters Pat. 3,506,613 and its abandoned parent, U.S. patent application Ser. No. 472,058, filed July 14, 1965 now abandoned.

THE INVENTION

This invention relates to the preparation of novel polymer blends that exhibit fluorescence when subjected to selected activation energy. More particularly, the present invention relates to polymers produced by the reaction of aliphatic diamines with diketones (as more particularly defined hereinafter) to produce polyazines which have the particularly desirable property of fluorescing under proper excitation and the blending of such polymer with another polymer(s) in an amount sufficient to impart fluorescence to the resulting blend.

In the prior art, polymers have been prepared by reacting amines and ketones. However, such preparations have comprised the use of aromatic and/or trifunctional monomers and have typically resulted in polymers which do not exhibit fluorescence. Although fluorescence exhibiting polymers have resulted from such prior art preparations, the fluorescence property has been due to the presence of chromophore groups, e.g., such as aromatic radicals, which inherently tend to exhibit fluorescence independently of the polymer, especially when such chromophore groups are in a cross-conjugating position.

In accordance with this invention, it has been discovered that aliphatic diamine(s) and aliphatic or aromatic substituted aliphatic diketone(s) may be reacted to prepare a linear, non-cross-conjugated polyazine which exhibits fluorescence under appropriate energy excitation, said polyazine having no chromophore groups in its polymeric structure which will internally absorb the fluorescence emission of the polymer; that is, chromophore groups with an absorption edge overlapping the fundamental fluorescence emission band of the linear polyazine.

More particularly, in accordance with this invention, there is prepared a polymer blend comprising a linear, non-cross-conjugated polyazine which contains the recurring structure represented by the structural formula:

(I) 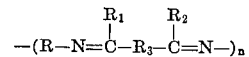

wherein R is a divalent hydrocarbon radical which is aliphatic or cycloaliphatic, $R_1$ and $R_2$ are the same or different monovalent aliphatic, or cycloaliphatic, or aromatic substituted aliphatic hydrocarbon groups, each group preferably having 1 to 12 carbon atoms, and $R_3$ is an aliphatic or cycloaliphatic group having 1 to 4 carbon atoms, and containing no conjugated atoms, and $n$ is a number with a value of at least 2.

In accordance with a preferred embodiment of this invention, there is prepared a polymer blend comprising a polymer of the recurring structure represented by Formula I wherein R is a divalent hydrocarbon group as defined above and containing from 1 to 12 carbon atoms, $R_1$ and $R_2$ are alkyl groups from 1 to 12 carbon atoms and $R_3$ is an alkylene group containing from 1 to 4 carbon atoms.

Polymers of the foregoing structure are known as polyazines and have desirable properties in general. However, the polyazines prepared in the practice of this invention exhibit fluorescence when subjected to selected excitation energy, such as long wave ultraviolet light, thereby making such polymers particularly valuable for many useful purposes.

To produce the polyazines of this invention, a selected aliphatic diamine is reacted with a selected aliphatic or aromatic substituted aliphatic diketone under appropriate conditions to yield the desired polyazine structure.

Suitable aliphatic diamines which may be used herein include those having the structural formula:

wherein R is a divalent aliphatic or cycloaliphatic hydrocarbon group having 1 to 12 carbon atoms such as alkylene, e.g., methylene, ethylene and propylene through dodecylene, both normal and isometric forms, cyclohexylene and similar cycloalkylene groups, and the like.

The aliphatic or aromatic substituted aliphatic diketones that are reacted with the foregoing diamines according to this invention are represented by the structural formula

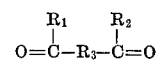

wherein $R_1$ and $R_2$ are the same or different monovalent aliphatic cycloaliphatic, or aromatic substituted aliphatic hydrocarbon groups, preferably containing 1 to 12 carbon atoms, e.g., alkyls such as methyl, ethyl, propyl, cyclohexyl and similar cycloalkyl groups, phenyl substituted alkyls and the like, and $R_3$ is an aliphatic divalent hydrocarbon residue containing no conjugated atoms and having 1 to 4 carbon atoms, e.g., alkylene such as methylene, ethylene, and cycloalkylene such as cyclohexylene, and the like.

Examples of suitable aliphatic diamines include hexamethylene diamine, ethylene diamine and menthane diamine. Suitable aliphatic or aromatic substituted aliphatic diketones include acetyl acetone, 2,5 hexane dione, 2,3, butanedione, and 1 phenyl 1,3 butanedione.

In preparing the polyazines of this invention, the selected diamine and diketone are reacted under appropriate conditions to yield the desired polymer. Generally, the reaction mixture containing the diamine and the diketone is heated to reflux temperatures. After the reaction has proceeded, the water of condensation that is formed in the course of the reaction is removed by any suitable means such as distillation. Thereafter, the desired product is recovered. Depending on the extent of polymerization, proportions, particular ingredients and the like, the nature of the resulting product can vary considerably, ranging from liquids through waxes to solid materials. Depending upon the ultimate use, e.g., the ingredients of the ultimate blend, the reaction may be halted at any point and the product recovered to obtain specific desired characteristics.

The novel polymers of this invention are compounded and blended with other resins such as polyethylene, polyacrylates, polyepoxides, etc., in an amount sufficient to impart fluoroescence to the resulting blend when the blend is exposed to suitable high energy activations, e.g., about .1 to about 5 percent by weight fluorescent polymer, typically about 1 to about 3 percent by weight. For example, when blended with polyethylene, the composition will fluoresce under a long wave ultraviolet light. Waxy polymers of this invention may also be used as a plasticizing agent for a synthetic resin such as nylon, for example, to produce a plasticized fluorescent polymer composition. Thus, the polyazines of this invention may be blended with synthetic resins of various types, with particularly suitable results being obtained with thermoplastic polymers of an ethylenically unsautrated monomer.

The following Examples I to VI serve to illustrate the present invention including some of the best modes contemplated by the inventor in the practice thereof.

EXAMPLE I

Ten (10) grams (.167 mole) of acetyl acetone are heated to reflux with 11 grams (0.0985 mole) of 1,6-hexamethylene diamine until the temperature has dropped to 102° C. showing that water has formed. After about 2 hours the condenser is turned to distillation. After the temperature has gradually risen to 250° C., the reaction mixture is poured into aluminum cups. A waxy material results. This waxy material fluoresces under long wave ultraviolet light with a blue color. Three (3) percent by weight of the waxy polymer is then blended with polyethylene to produce a fluorescent polymer blend.

EXAMPLE II

Twelve (12) grams (.2 mole) of ethylene diamine are reacted as in Example I with 20 grams (.333 mole) of acetyl acetone. After refluxing the mixture for about 2 hours the condenser is turned to distillation. The distillation is completed at 200° C. and the product is thereafter removed and observed to be a dark fluid which fluoresces under long wave ultraviolet light with a blue color. Two (2) percent by weight of the polymer is blended with 6,6-nylon to produce a fluorescent polymer blend.

EXAMPLE III

Twenty (20) grams (0.2 mole) of acetyl acetone and 31.2 grams (0.2 mole) of menthane diamine are reacted as in the foregoing examples. The reaction mixture is heated until the pot temperature reaches 290° C. and is distilled for about 3 hours until about 4.2 milliliters of water is collected. The reaction product is poured into aluminum cups to cool. A dark, viscous resin results. The resin fluoresces under long wave ultraviolet light with a blue color. Two (2) percent by weight of the polymer is blended with methyl methacrylate to produce a fluorescent polymer blend.

EXAMPLE IV 17.1 grams (0.15 mole) of 2,5 hexane dione and 17.4 grams (0.15 mole) of 1,6 hexanediamine are reacted as in the foregoing examples. The reaction mixture is heated to 240° C. and is distilled for 3 hours until 10 milliliters of an azeotrope has collected. A solid, waxy resin results. The resin fluoresces under long wave ultraviolet light with an intense blue color. One (1) percent by weight by the resin is compounded with polypropylene to produce a fluorescent polymer blend.

EXAMPLE V 12.9 grams (0.15 mole) of the butanedione is placed in a 250 milliliter flask and 9.0 grams (0.15 mole) of the diamine is added slowly with a dropping funnel. The mixture is then heated to a temperature of 97° C. for 3 hours. Upon cooling a dark brown, viscous resin results. The resin slightly fluoresces under long wave ultraviolet light with a blue color. One (1) percent by weight of the resin was compounded with polyvinyl chloride to produce a fluorescent polymer blend.

EXAMPLE VI 23.2 grams (0.2 mole) of 1,6 hexanediamine and 20.0 grams (0.2 mole) of acetyl acetone are heated to reflux for about 2 hours and 5–6 milliliters of distillate are collected. The pot temperature gradually increases to 300° C. The reaction product is then cooled by pouring into an aluminum cup. A tan waxy solid resin results which fluoresces under long wave ultraviolet light with a deep blue. Three (3) percent by weight of the resin is compounded with polystyrene to produce a fluorescent polymer blend.

The proportions of the reactants which are combined to produce the novel polyazine resins of this invention can vary over a considerable range. The preferred ratio is about 1 mole of the aliphatic diketone to about 0.6 mole of the diamine; however, the ratio can be extended in either direction so long as there is apolymerizing proportion of reactants present. Generally, the mole ratio of diketone to diamine ranges from about 1:1 to about 2:1. Reflux conditions are generally used in heating the diamine with the aliphatic diketone and the water that is formed as a result of the reaction is removed by distillation. The characteristics of the resulting polymeric product can vary from a liquid material to a waxy material to a thermosetting resin. The exact nature will depend on the choice of reactants, reaction conditions and the like. It is not intended that the scope of the present invention be limited to any specific physical characteristics of the polymer.

Various other modifications will be apparent to and can readily be made by those skilled in the art without departing from the scope and spirit of this invention.

I claim:

1. As a composition of matter, a fluorescent polymeric blend comprising a thermoplastic synthetic resin and a small effective amount of a linear, non-cross-conjugated fluorescent polyazine having the following structural unit:

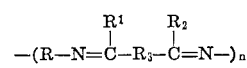

wherein R is a divalent aliphatic or cycloaliphatic hydrocarbon radical containing from 1 to 12 carbon atoms, $R_1$ and $R_2$ are the same or different monovalent aliphatic, cycloaliphatic, or aromatic substituted aliphatic hydrocarbon groups, each group having 1 to 12 carbon atoms, $R_3$ is selected from the group consisting of aliphatic groups having 1 to 4 carbon atoms and cyclohexylene and containing no conjugated atoms, and $n$ is a number with a value of at least 2.

2. The composition of claim 1 wherein the amount of polyazine in the blend is about .1 to 5 percent by weight.

3. The composition of claim 1 wherein the amount of polyazine in the blend is about 1 to 3 percent by weight.

4. The composition of claim 1 wherein the polymeric blend exhibits a blue fluorescene when subjected to an energy excitation of long wave ultraviolet light.

5. The polyazine of claim 1 wherein R is an alkylene group, $R_1$ and $R_2$ are the same or different alkyl groups, and $R_3$ is an alkylene group.

6. The polyazine of claim 1 wherein the fluorescene is blue and the energy excitation is long wave ultraviolet light.

7. The polyazine of claim 1 wherein said polyazine is derived from the reaction of an aliphatic diamine and an aliphatic or aromatic substituted aliphatic diketone.

8. The composition of claim 1 wherein the synthetic resin is selected from polyolefin, polyvinylchloride, and methyl methacrylate.

9. The composition of claim 1 wherein the polyazine is prepared from hexamethylene diamine and acetyl acetone.

10. The composition of claim 1 wherein the polyazine is prepared from ethylene diamine and acetyl acetone.

References Cited

UNITED STATES PATENTS 2,652,367  9/1953  Adelson _____ 252—46.7
2,659,712  11/1953  Thompson et al. _____ 260—65

TOBIAS E. LEVOW, Primary Examiner

A. P. DEMERS, Assistant Examiner

U.S. Cl. X.R.

260—28, 29.1R, 857R, 874, 897R, 899, 901